(12) United States Patent
Carau, Sr. et al.

(10) Patent No.: US 6,516,358 B1
(45) Date of Patent: Feb. 4, 2003

(54) APPLIANCE COMMUNICATIONS MANAGER

(75) Inventors: Frank P Carau, Sr., Loveland, CO (US); Michael L Rudd, Fort Collins, CO (US); Philip E Jensen, Bellvue, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/392,897

(22) Filed: Sep. 9, 1999

(51) Int. Cl.[7] .......................... G06F 13/14; G06F 13/20
(52) U.S. Cl. .......................... 710/36; 710/3; 710/37; 710/39; 710/268; 709/228; 709/238; 709/227; 709/244; 709/252
(58) Field of Search ...................... 710/3, 36, 37, 710/39, 268; 709/238, 244, 252, 228, 227

(56) References Cited

U.S. PATENT DOCUMENTS

| | | | | |
|---|---|---|---|---|
| 5,109,222 A | | 4/1992 | Welty | |
| 5,276,679 A | * | 1/1994 | McKay et al. | 379/358 |
| 5,555,298 A | * | 9/1996 | Jonsson | 379/210.01 |
| 5,790,800 A | * | 8/1998 | Gauvin et al. | 709/203 |
| 6,003,084 A | * | 12/1999 | Green et al. | 709/203 |
| 6,119,180 A | * | 9/2000 | Terho et al. | 375/222 |
| 6,289,373 B1 | * | 9/2001 | Dezonno | 709/200 |

FOREIGN PATENT DOCUMENTS

| | | |
|---|---|---|
| WO | WO 98/29944 | 7/1998 |
| WO | WO 99/09780 | 2/1999 |

* cited by examiner

Primary Examiner—Jeffrey Gaffin
Assistant Examiner—Rehana Perveen

(57) ABSTRACT

A novel method and apparatus for managing communication transactions between electronic appliances is presented. The invention includes a source input/output (I/O) communications function which establishes a first communication link between the apparatus and a source appliance, and a destination I/O communications function which establishes a second communication link between said apparatus and a destination appliance. The apparatus stores and executes a communications program in program memory which manages communications transactions between the source I/O communications function and destination communications function.

13 Claims, 5 Drawing Sheets

APPLIANCE COMMUNICATIONS MANAGER

FIELD OF THE INVENTION

The present invention pertains generally to electronic appliances, and more particularly to a simplified communications manager for appliance-to-appliance communications transactions.

BACKGROUND OF THE INVENTION

The increasing use of portable computing appliances means that a user may store and work on data files on a fixed desktop computer at his workstation on site, and take a personal computing appliance such as a portable or palm top computer with him for use off-site. Data may be transferred between the desktop appliance and the personal computer appliance either by a close range infrared (I.R.) or other optical link, or a cable when the two are in close proximity, or via a modem link when the user has the personal computing appliance with him off site. The remote access provided by electronic appliances allows greater flexibility and convenience.

Appliances contain built in communications ability, such as infrared or very short range radio, which allows direct short distance communication. However, communications between appliances at a distance presents heightened challenges to users. Different communication standards, capabilities, and interfaces for plain old telephone systems (POTS), cellular telephones, wireless local area networks (LANs), and wide area networks (WANs) add complexity to individual appliances to manage the broad range of connections.

Accordingly, a need exists for a simplified appliance communications manager that allows direct appliance-to-appliance communication regardless of the complexity of establishing the logical communication connection—either for short- or long-range communications.

SUMMARY OF THE INVENTION

The present invention is a novel communications manager for electronic appliances which allows an appliance to interact directly with other appliances without the need for a personal computer to control the transactions. The invention further allows an appliance to communicate many forms of information with other appliances over a wide range of distance—from a few feet to around the globe.

In accordance with the invention, the appliance communications manager manages communications transactions between appliances. In the illustrative embodiment, the communications manager comprises a processor, memory, and one or more I/O communications functions that establish the connections between the appliances through a variety of communications standards, thereby enabling appliance-to-appliance connections through these multiple channels. Preferably, a standard appliance language such as Hewlett Packard's JetSend™ is used as the communications protocol for the connection links between the appliances. The appliance communications manager may be a stand-alone device or may be integrated into one or more appliances. As a stand-alone device, it may also include a display and keyboard to allow names, addresses, phone numbers, IP and/or other connection information to be input into and stored by the appliance communication manager in order to facilitate fast appliance-to-appliance connections.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A novel appliance communication manager for allowing simplified user communication transactions is described in detail hereinafter. Although the invention is described in the context of the illustrative embodiments, which employ preferred components such as the Hewlett Packard JetSend® communication protocol as the standard appliance language, it will be appreciated by those skilled in the art that the principles of the invention extend to any appliance communications management system that allows direct communication between multiple appliances, regardless of physical proximity and I/O interface requirements of the appliances, using a standard appliance communication language.

Figure 1:
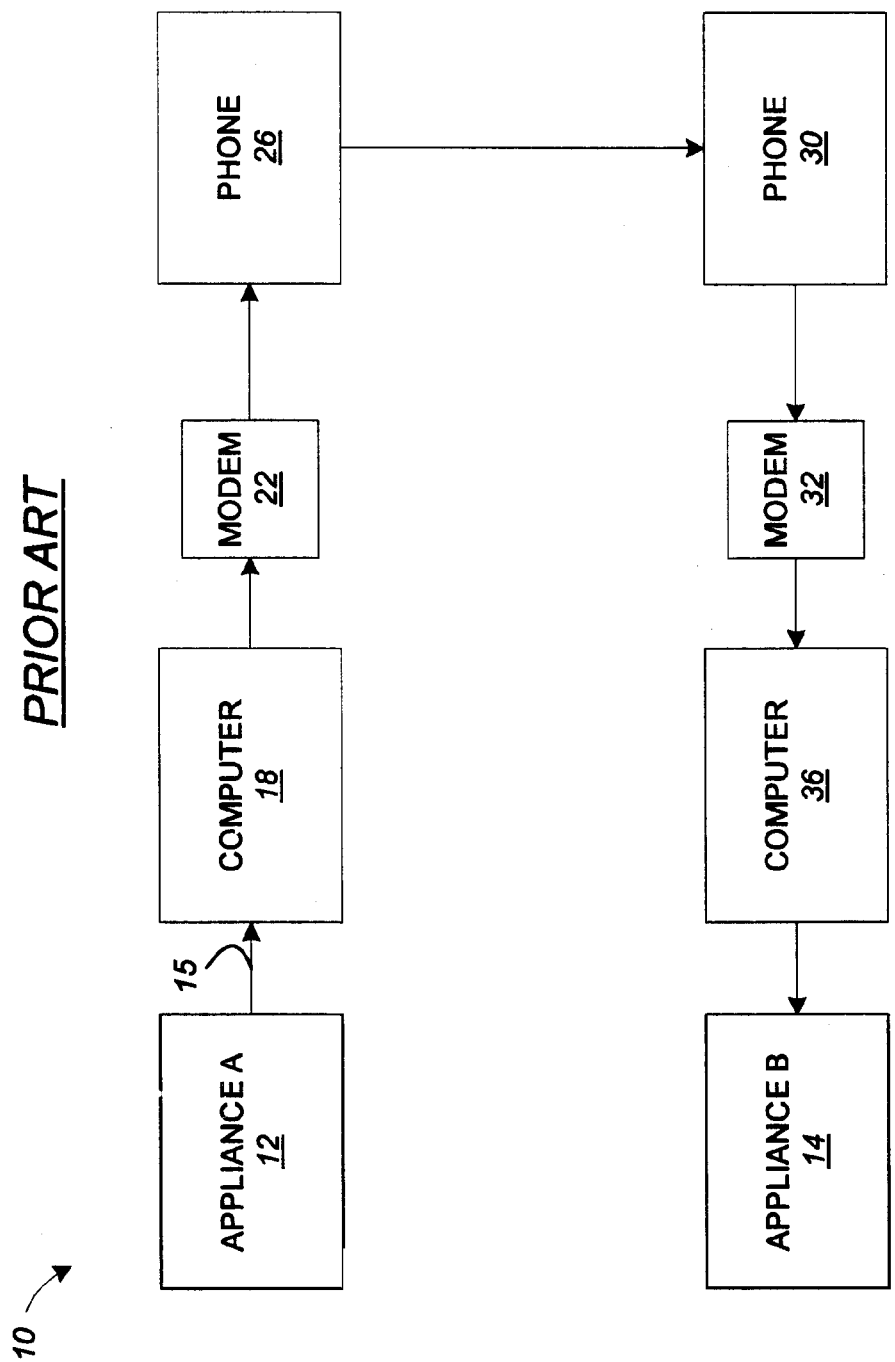
FIG. 1 is a block diagram of a prior art communication system.

To facilitate an understanding of the advantageous features of the invention, a description of a prior art appliance communication system is first presented. Turning now to FIG. 1, there is illustrated a prior art communication system 10 in which a first appliance A 12 communicates with a remotely located second appliance B 14. To allow such communication, a computer system 18 such as a notebook computer receives signals 15 from appliance A 12. Appliance A 12 and computer 18 are capable of communicating both remotely, e.g. via a modem link, and directly, when the host and portable device are docked or otherwise locally associated. Computer 18 interprets the received appliance signals 15 to extract communication information, including the destination address and/or transmission frequency, the actual information that is to be transmitted, etc., for the transaction. Based on this information, computer 18 sets up a modem 22 and causes it to dial up a phone 26, such as a plain old telephone system (POTS), or analog or digital cellular phone. The phone 26 establishes communication with the destination appliance B 14, typically via a phone 30, modem 32, and computer 36 in communication with Appliance B 14 at the other end of the logical connection. Appliance B 14 and computer 36 are capable of communicating both remotely, e.g. via a modem link, and directly, when the host and portable device are docked or otherwise locally associated.

The prior art communication system 10 of FIG. 1 is problematic for several reasons. First, the use of an intermediate computer to set up and establish a communications link between two appliances requires significant intervention on the part of the user to activate the software that controls input (e.g., via an infrared (IR) port) from one appliance and the software that controls output (e.g., via an analog or digital modem) to another appliance. This requires booting up the computer, starting up the receive software, ensuring that the data from the source appliance is received, translating the received data to a format recognizable by the destination appliance, starting up the send software (e.g., a fax program), setting up the send connection (e.g., entering the name, address, phone number, transfer protocol, and data format) within the send software, and monitoring the status of the send software to make sure that the data was transferred to the destination appliance without error. As will be appreciated, the user's assistance in the communication transaction is necessary and significant. In addition, the requirement for intermediate equipment, software, and user intervention significantly increases the time required to establish a connection link between appliances and complete a communication transaction.

Figure 2:
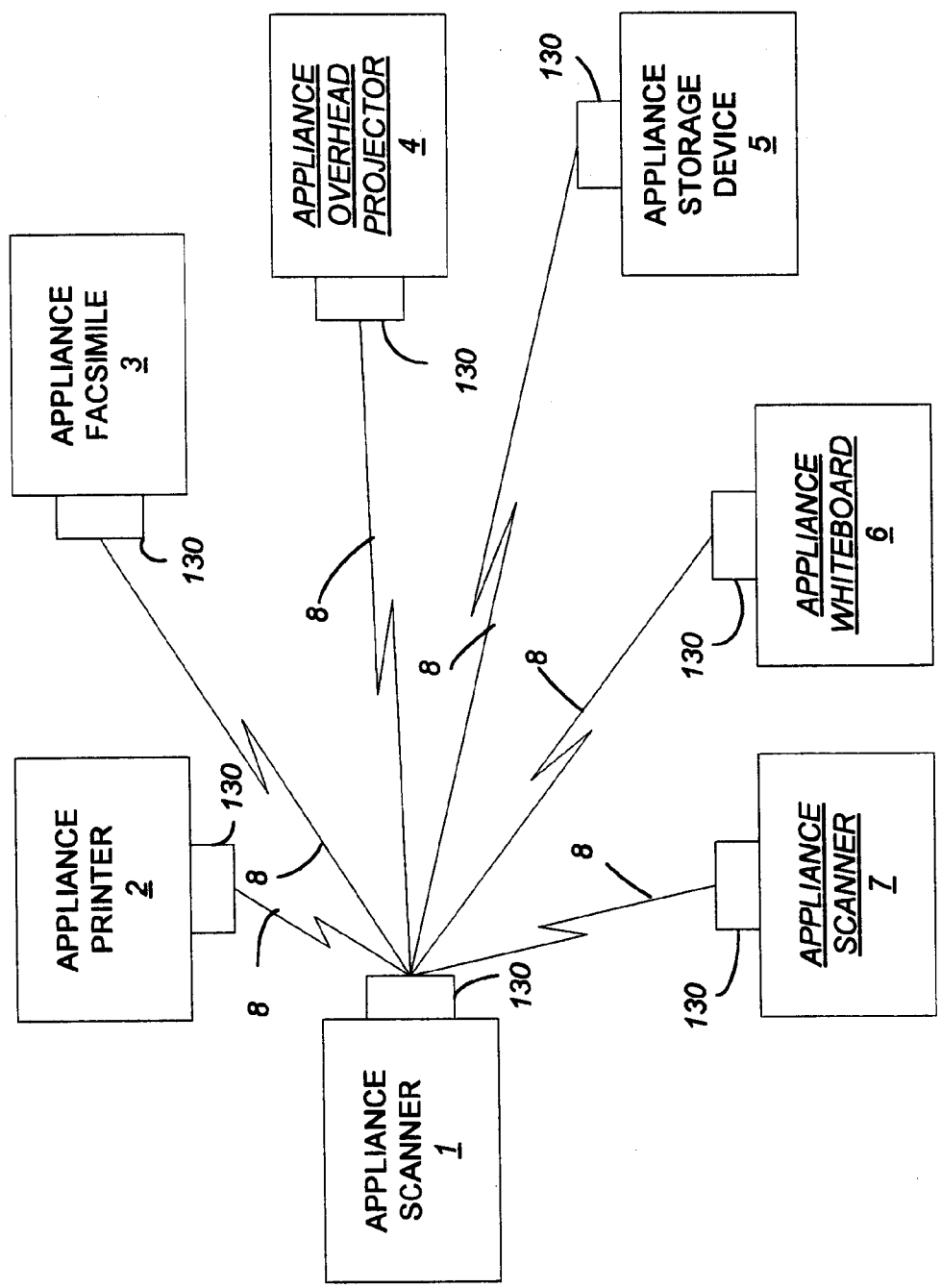
FIG. 2 is a high level block diagram of a communication system illustrating appliance communication.

In the environment contemplated for use of the invention, appliances are capable of communicating directly with one another, as illustrated in FIG. 2. Thus, for example, an appliance scanner 1 is capable of communicating directly with one or more of appliance printer 2, appliance facsimile machine 3, appliance overhead projector 4, appliance storage device 5 (e.g., a document briefcase), appliance whiteboard 6, and/or another appliance scanner 7. Communication links 8 are established between the communicating appliances by way of an appliance communication manager 130 implemented in accordance with the invention. The appliance communication manager 130 may be a standalone device that connects to each of the communicating appliances 1–7, or alternatively may be integrated into each of the communicating appliances 1–7. Importantly, as discussed hereinafter, not every appliance requires an appliance communications manager 130 in order to communicate. As long as at least one of the source and destination appliances is connected to an appliance communications manager 130, and the particular implementation of the appliance communications manager 130 includes communications modules that allow it to communicate using the technologies of both the source and destination, communication is easily established.

Figure 3:
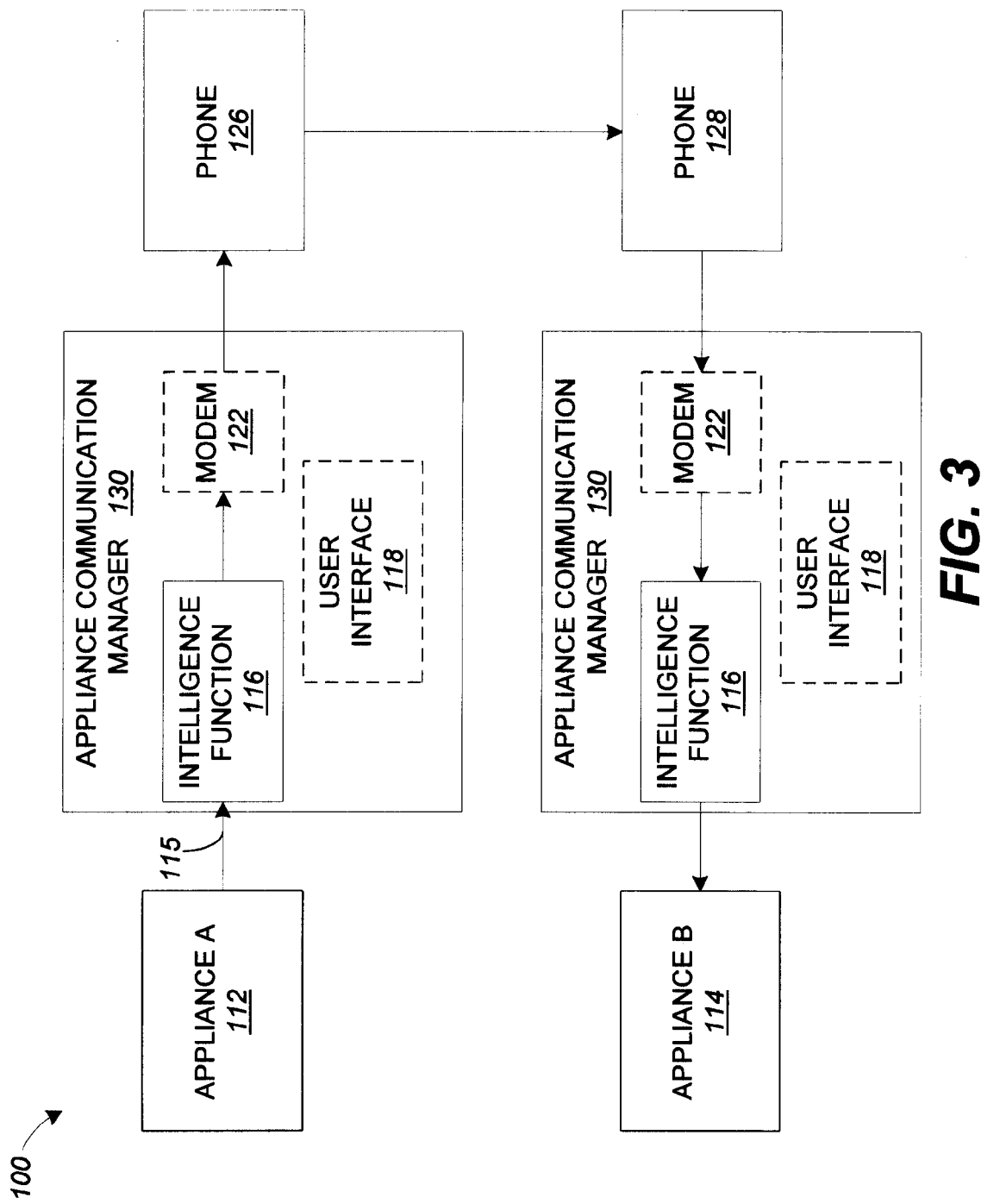
FIG. 3 is a block diagram of an appliance communication system implemented in accordance with the invention.

FIG. 3 is a block diagram illustrating the use of the appliance communication manager 130 of the invention. In this embodiment, appliance A 112 communicates with appliance B 114. To allow such communication, an appliance communications manager 130 is connected to appliance A 112 from which it receives signals 115. Appliance communications manager 130 includes a dedicated intelligence function 116 and optionally a modem 122. Intelligence function 116 interprets the appliance signals 115 to extract communication information, including the destination address and/or transmission frequency, the actual information that is to be transmitted, etc., for the transaction. Based on this information, intelligence function 116 sets up modem 122, which may be integrated into manager 130 as shown, or may reside external to appliance communications manager 130, and causes modem 122 to dial up phone 126. Phone 126 may be a plain old telephone system (POTS), a digital or analog cellular phone, etc. The phone 126 establishes logical connection with the destination appliance B 114, typically via a communication link from phone 128 to another appliance communications manager 130 connected to appliance B 114.

Figure 4:
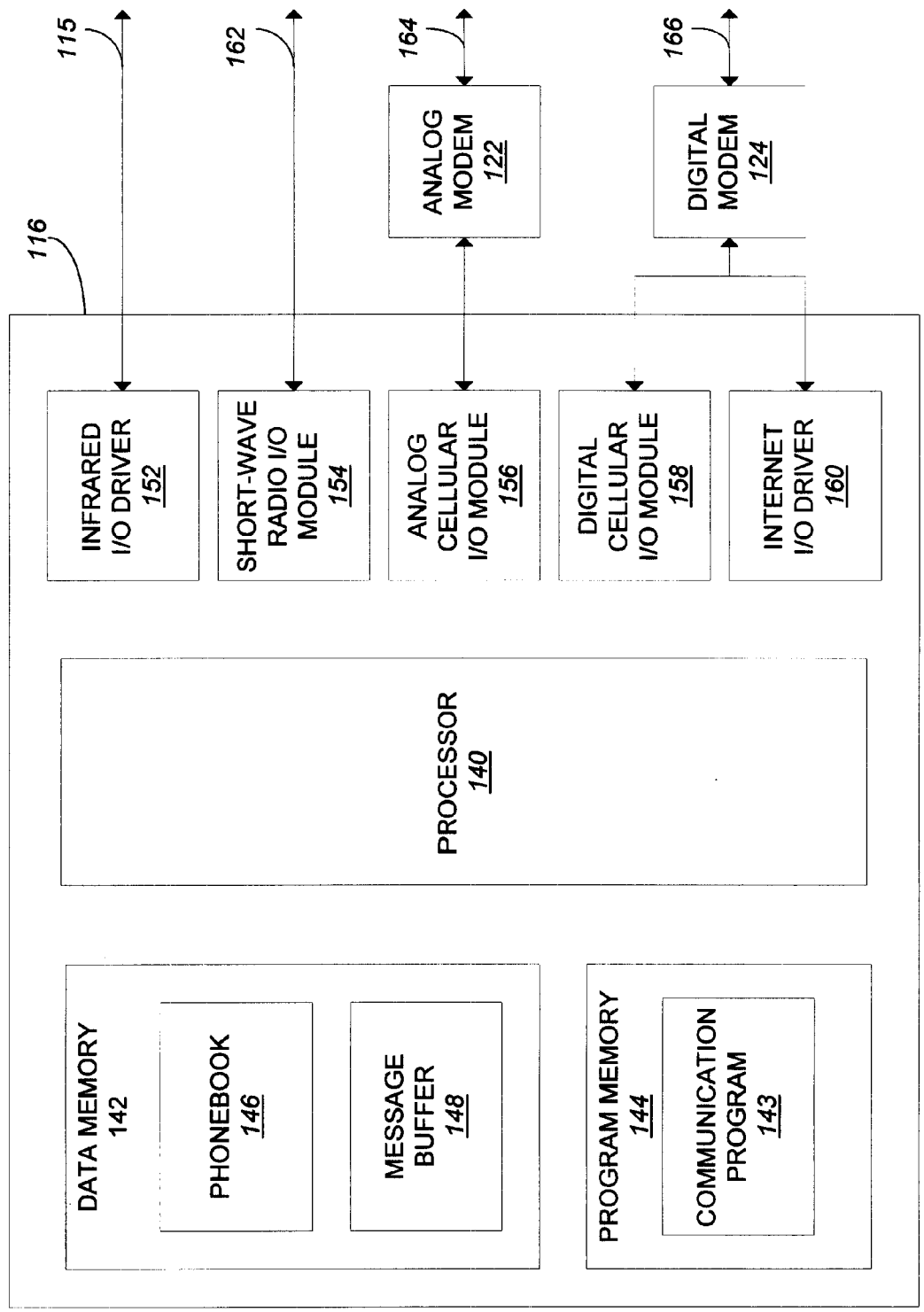
FIG. 4 is a functional block diagram of an intelligence function implemented in accordance with the invention.

FIG. 4 is a functional block diagram of intelligence function 116. As illustrated, intelligence function 116 comprises a processor 140, data memory 142, program memory 144, and one or more I/O drivers 152, 154, 156 and 158. Program memory 144 stores communications programs 143, which control communication transactions via the appropriate I/O driver 152, 154, 156, 158, according to the communication transaction information for the particular communication transaction in process. Data memory 142 stores communication transaction information input by the user such as names, associated phone numbers, and associated appliance interface information such as which I/O driver should be used to establish communication with the associated appliance.

Appliance communication manager 130 may include as many I/O drivers 152, 154, 156, 158 as needed to establish logical communication connections for various communication technologies. For example, it may be desired to allow an appliance that communicates via infra-red (IR) communication to communicate with other appliances via short-wave radio, analog cellular phones, digital cellular phones, and the Internet. In the prior art, this would require the appliance itself to include an I/O driver for each of the different possible communication technologies, namely, an IR I/O communication module, a short-wave radio communication module, an analog cellular telephone communication module including an analog modem 122, a digital cellular telephone communication module including a digital modem, and an Internet communication module. Using the appliance communications manager of the present invention, an appliance that communicates using one particular technology can achieve the ability to communicate with other appliances that communicate using a different technology without having all of the additional hardware modules necessary to achieve the communication. In particular, the appliance simply hooks up to the appliance communications manager 130 of the invention using its standard communication technology, and the appliance communications manager 130 receives the communication, translates it into a standard communications protocol, and sends it to the destination appliance using the I/O driver appropriate to the communications technology used by the destination appliance. Accordingly, appliance communications manager 130 preferably includes at least the I/O communications modules and drivers necessary for communication with both the source appliance and destination appliance, and can include two or more of an IR I/O communications module 152, a short-wave radio communication module 154, and analog cellular telephone communication module 156 which communicates with an analog modem 122, a digital cellular telephone communication module 158 which communicates with a digital modem 124, and an Internet communication module 160, which communicates with an Internet Service Provider (ISP) via either an analog 122 or digital 124 modem. Preferably, appliance communications manager 130 is a portable, stand-alone device that connects to various appliances to enable them to communicate with other appliances using different communications technologies.

In the preferred embodiment, all communications 115, 162, 164, 166 received into and transmitted from appliance communications manager 130 are implemented using a standard communication protocol. In the preferred embodiment, the standard communication protocol is Hewlett Packard's JetSend™ communications protocol. JetSend™ is a communications protocol for device independent information exchange. The protocol allows two devices to connect, intelligently negotiate the best possible data type, provide device status, and exchange information, without user intervention. JetSend™ is platform independent and enables communication between a broad range of appliances and data formats across any reliable, bi-directional transport medium (Internet, intranet, phone lines, infrared, etc.). JetSend™ operates as on-board intelligence allowing appliances to communicate directly with one another without the need for a server or detailed information (such as a device driver) to communicate with another JetSend™ appliance. JetSend also allows exchange of control information (e.g., multiple destination appliance addresses for establishing multiple simultaneous connections with the each of the selected destination appliances, or appliance configuration commands such as sending a multicopy command or paper size setting command to a printer).

In an illustrative example, appliance communications manager 130 is connected to a source appliance A 112 which communicates via infrared technology. Infrared communication interfaces are particularly desirable for use in small and portable computing devices. For example, some notebook computers include an IR port for high speed data transmission. A high speed IR port is used for sending data from the notebook computer to a printer or for transferring data between the notebook computer and a docking station, a desktop computer, a network server computer, another notebook computer or a personal digital assistant computing device (PDA). In this example, appliance communications manager 130 includes an infrared (IR) communications module 152, which allows a logical communication connection to be established via an IR communication link 115 between the source appliance A 112 and the appliance communications manager 130. A characteristic of the IR communication module 152 is the lack of a wire for carrying signals between the appliance communications manager 130 and the appliance 112. The lack of a wire reduces the number of components a user handles and reduces the weight of appliances to be transported. The lack of a wire also makes the process for connecting to another appliance an automated process.

Also in the example of FIG. 4, appliance communications manager 130 includes I/O communications modules 154, 156,158 and 160, which allow a source appliance communicating via one communications technology (e.g., IR) to communicate with other destination appliances that communicate using a different communications technology (e.g., short-wave radio, analog cellular telephone, digital cellular telephone, and the Internet). Thus, source appliance A 112 can communicate with any other appliance so long as the other appliance can communicate over IR, short-wave radio, analog or digital cellular telephone, or IP network, and communicates using the standard appliance protocol.

In the preferred embodiment, data memory 142 stores a phonebook 146 which includes address communication information for various destination appliances. The phonebook information includes a phonebook entry for each destination appliance. Preferably, each phonebook entry includes a name associated with the destination appliance and any necessary network communication information required to establish a logical connection with the associated destination appliance.

Data memory 142 also preferably includes a message buffer 148. Typically, the transfer time between the source appliance and appliance communications manager 130 will be much faster than the transfer time between the appliance communications manager 130 and destination appliance due to the typical closer proximity of the appliance communications manager 130 to the source appliance 112 than to the destination appliance 114, and also since the communication technology of the source application (e.g., direct wire, or wireless IR technology) is typically high speed, whereas the communication technology to the destination appliance 114 (e.g., cellular telephone) is typically a lower speed technology. Communication messages received from source appliance 112 are stored temporarily in message buffer 148 until a connection with the desired destination appliance is established and the messages are transmitted over the connection to the connected destination appliance. Communication messages may include connection establishment messages such as transfer format messages and data format messages, and data messages containing actual appliance data.

Figure 5:
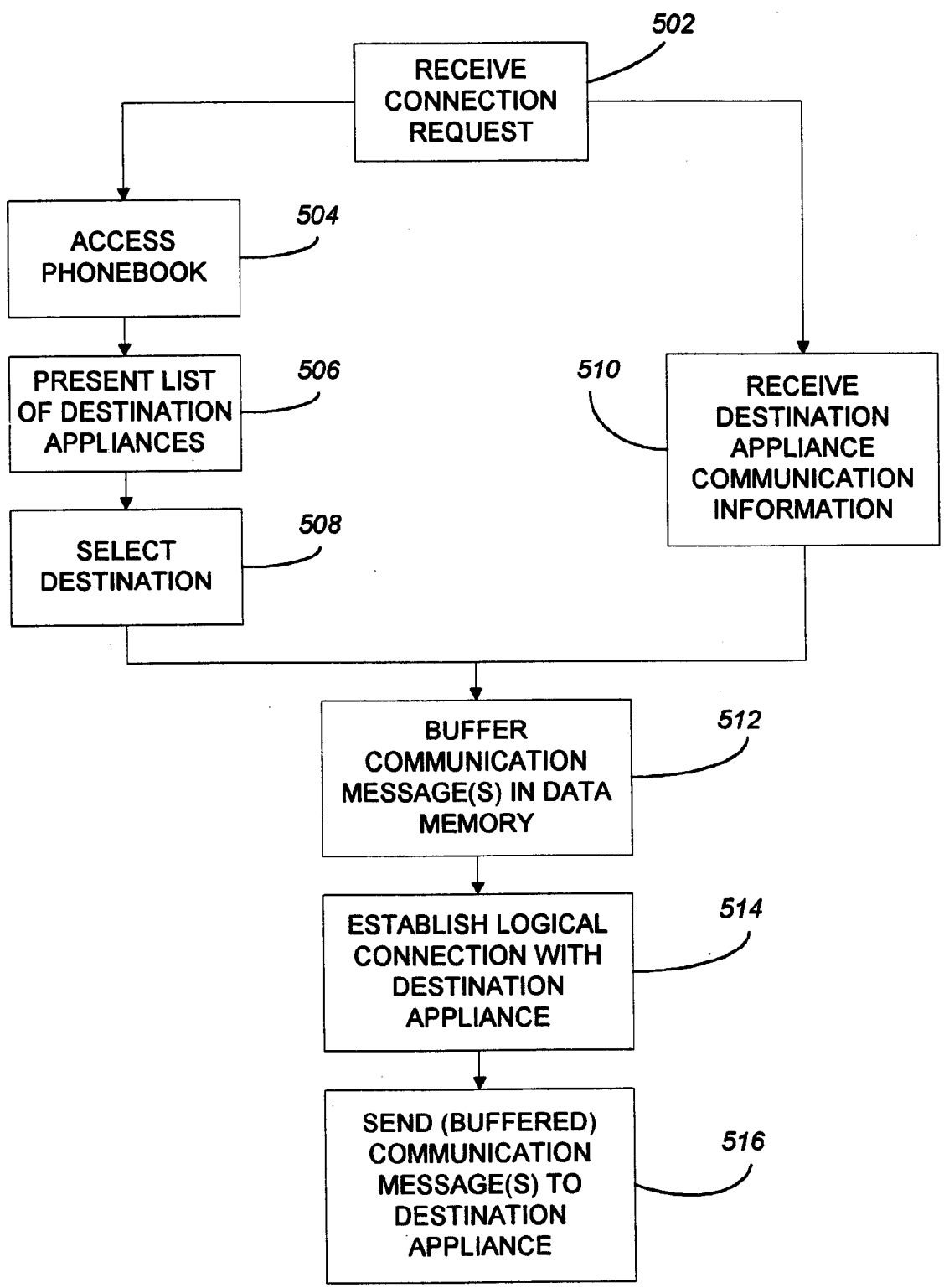
FIG. 5 is a flowchart of a communication transaction performed by an appliance communications manager implemented in accordance with the invention.

FIG. 5 is a flowchart of a communication transaction performed by the appliance communications manager 130 of the invention. As illustrated, appliance communications manager 130 receives 502 a connection request. Processor 140 accesses 504 phonebook 145 in data memory 142 and presents 506 a list of destination appliance options either back to the source appliance via a communications message, or via an optional user interface 118 supplied with the appliance communications manager 130. The user selects 508 a destination appliance from the presented list of destination appliance options. Alternatively, the user inputs 510 a destination appliance along with its associated communications information. In an optional step, processor 140 downloads 512 the communication message(s) from appliance 112 into message buffer 148 of data memory 142. Processor 140 establishes 514 a logical connection with the destination appliance for the communication transaction (e.g., sets up a modem or establishes an Internet connection) via the appropriate I/O driver 154, 156,158, 160. Once a logical connection is established, processor 140 sends 514 the communication message(s) stored in data memory 142 to the destination appliance.

It will be appreciated from the above detailed description that the present invention provides significant advantages over the prior art. By providing a generic appliance communications manager that interfaces via a standard appliance communication protocol with a wide variety of different appliances from a variety of manufacturers, the appliance communications manager of the invention facilitates direct appliance-to-appliance connection without the use of intervening equipment such as a computer system. In addition, the invention hides all the connection setup tasks from the user, thereby simplifying and reducing the amount of time required to establish an appliance-to-appliance connection and complete the communication transaction.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. An apparatus for managing communication transactions between electronic appliances, comprising:

a source input/output (I/O) communications function which establishes a first communication link between said apparatus and a source appliance and receives a communication message from said source appliance;

a destination I/O communications function which establishes a second communication link between said apparatus and a destination appliance;

a program memory;

a communications program stored in said program memory which manages communications transactions between said source I/O communications function and said destination communications function; and a processor which executes said communications program.

2. An apparatus in accordance with claim 1, wherein:

said communication message is implemented using a standard appliance communication protocol.

3. An apparatus in accordance with claim 1, comprising:

a data memory which stores communication messages received from said source appliance until said second communications link is established between said apparatus and said second appliance.

4. An apparatus in accordance with claim 1, comprising:

a data memory which stores an electronic phonebook, said phonebook comprising a plurality of phonebook entries, each of said phonebook entries comprising an appliance identifier and associated appliance connection information.

5. An apparatus in accordance with claim 4, wherein:

said processor presents said phonebook to a user.

6. An apparatus in accordance with claim 5, comprising:

a user interface for displaying said phonebook to said user and allowing said user to enter an address into said phonebook.

7. An apparatus in accordance with claim 5, wherein:

said processor sends at least one of said phonebook entries to said source appliance for presentation to said user thereby.

8. An apparatus for managing communication transactions between electronic appliances, comprising:

a source input/output (I/O) communications function which communicates with a source appliance and receives a communication message from said source appliance;

a destination input/output (I/O) communications function which communicates with a destination appliance;

an appliance communications function which processes said communication message received by said I/O communications function from said source appliance, establishes a communication link with said destination appliance to which said communication message is addressed via said destination I/O communications function, and sends said communication message to said destination appliance.

9. An apparatus in accordance with claim 8, wherein said appliance communications function comprises:

a program memory;

a communications program stored in said program memory which performs said processing of said communication message, said establishing of said communication link with said destination appliance, and said sending of said communication message to said destination appliance; and a processor which executes said communications program.

10. An apparatus in accordance with claim 8, wherein:

said communication message is implemented using a standard appliance communication protocol.

11. An apparatus in accordance with claim 8, comprising:

a data memory which stores said communication message received from said source appliance until said communications link is established between said apparatus and said destination appliance.

12. An apparatus in accordance with claim 8, comprising:

a data memory which stores an electronic phonebook, said phonebook comprising a plurality of phonebook entries, each of said phonebook entries comprising an appliance identifier and associated appliance connection information.

13. An apparatus in accordance with claim 5, comprising:

a user interface which presents said phonebook to said user and allowing said user to enter an address into said phonebook.

* * * * *